United States Patent
Sano et al.

(10) Patent No.: US 6,756,973 B2
(45) Date of Patent: Jun. 29, 2004

(54) TOUCH PANEL DEVICE

(75) Inventors: Satoshi Sano, Kawasaki (JP);
Fumihiko Nakazawa, Kawasaki (JP);
Takashi Matsuda, Kawasaki (JP);
Yoshio Satoh, Kawasaki (JP); Takashi Katsuki, Kawasaki (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 298 days.

(21) Appl. No.: 09/866,848

(22) Filed: May 30, 2001

(65) Prior Publication Data

US 2002/0101408 A1 Aug. 1, 2002

(30) Foreign Application Priority Data

Jan. 26, 2001 (JP) ........................................ 2001-019276

(51) Int. Cl.[7] ................................................ G09G 5/00
(52) U.S. Cl. ..................... 345/177; 345/176; 178/18.04
(58) Field of Search ................................ 345/173, 176, 345/177; 310/313 R; 178/18.04, 18.03, 19.02; 341/22

(56) References Cited

U.S. PATENT DOCUMENTS

| | | | |
|---|---|---|---|
| 4,908,542 A | 3/1990 | Solie | |
| 5,717,434 A | 2/1998 | Toda | |
| 5,767,608 A | * 6/1998 | Toda | 310/313 R |
| 5,886,452 A | * 3/1999 | Toda | 310/313 R |
| 5,986,224 A | 11/1999 | Kent | |
| 5,994,817 A | * 11/1999 | Toda | 310/313 R |

FOREIGN PATENT DOCUMENTS

| | | |
|---|---|---|
| EP | 0 332 410 | 9/1989 |
| JP | 06 384396 A | 12/1994 |

OTHER PUBLICATIONS

Platshon M: "Surface Acoustic Wave Technology Expands Uses of Touch–Screen" Computer Technology Review, Westworld Production Co., Los Angeles, US, vol. 7, No. 13 (Sep. 21, 1987) pp. 18–21.

* cited by examiner

Primary Examiner—Dennis-Doon Chow
Assistant Examiner—Uchendu O. Anyaso
(74) Attorney, Agent, or Firm—Westerman, Hattori, Daniels & Adrian, LLP

(57) ABSTRACT

Surface acoustic waves are excited in two diagonal directions from each of IDTs (excitation elements) disposed on the upper side and the lower side of a non-piezoelectric substrate, and the surface acoustic waves propagated on a detection region are received by IDTs (receiving elements) disposed on the left side and right side of the non-piezoelectric substrate so that a position of an object touching the non-piezoelectric substrate is detected based on the reception results. In each IDT, comb-like electrode fingers are joined to two facing electrode bases (signal electrode and ground electrode) in such a manner that the comb-like electrode fingers are inclined from a facing direction of the electrode bases.

10 Claims, 21 Drawing Sheets

⟶ PROPAGATING
DIRECTION OF
SURFACE ACOUSTIC WAVE 13  11(12)

13  11(12)

13  11(12)

TOUCH PANEL DEVICE

BACKGROUND OF THE INVENTION

The present invention relates to a touch panel device for detecting the touch of a finger or an object on the touch panel device, and more particularly relates to a touch panel device using IDTs, for detecting a position touched by the finger or object by detecting a cutoff of surface acoustic waves.

With the spread of computer systems, mainly personal computers, there has been used a device for inputting new information or giving various instructions to a computer system by pointing at a position on a display screen of a display device on which information is displayed by the computer system, with a finger or an object. In order to perform an input operation with respect to the information displayed on the display screen of the display device of a personal computer or the like by a touching method, it is necessary to detect a touched position (indicated position) on the display screen with high accuracy.

Well known examples of touch panel device for detecting a position touched by a finger or an object are a device using a resistance film, and a device using ultrasonic waves. In the former device using a resistance film, a change in the resistance of the resistance film caused by the touch of the finger or object on the resistance film is detected. This device has the advantage of low consumption of power, but has the problems in the aspects of the response time, detection performance and durability.

By contrast, in the device using ultrasonic waves, a position touched by the finger or object is detected by propagating a surface acoustic wave (SAW) on a non-piezoelectric substrate, for example, and detecting attenuation of the surface acoustic wave caused by the touch of the finger or object on the non-piezoelectric substrate. In conventional touch panel devices of the ultrasonic wave type, however, since transducers for generating the surface acoustic waves and detecting the same are formed by ceramic transducers, this type of touch panel devices have problems, such as difficulty in reducing the thickness and size, higher costs of the parts and difficult mounting, in comparison with the touch panel devices of other types.

Therefore, there has been proposed a touch panel device using IDTs (Inter Digital Transducers comb-like electrodes) which can be formed collectively using a photolithography technique as transducers. This touch panel device uses elements, each constructed by an IDT and a piezoelectric thin film, as an excitation element for exciting a surface acoustic wave and a receiving element for receiving a propagated surface acoustic wave.

FIG. 1 is an illustration showing the structure of such a conventional touch panel device using IDTs. In FIG. 1, numeral 1 is a rectangular non-piezoelectric substrate made of a glass material, and a plurality of excitation elements 2, each constructed by an input IDT and a piezoelectric thin film, for exciting surface acoustic waves are arranged into a line on one end in each of the X-direction and Y-direction of the non-piezoelectric substrate 1 so that the excitation elements 2 correspond to a plurality of tracks, respectively. Moreover, a plurality of receiving elements 3, each constructed by an output IDT and a piezoelectric thin film, for receiving the surface acoustic waves are arranged into a line on the other end in each of the X-direction and Y-direction of the non-piezoelectric substrate 1 so that the receiving elements 3 face the excitation elements 2.

In the touch panel device shown in FIG. 1, an electric signal is input to each excitation element 2 to excite the surface acoustic waves and propagate them on the non-piezoelectric substrate 1, and the propagated surface acoustic waves are received by the receiving elements 3. Moreover, when a finger or an object touches a propagation path of the surface acoustic wave on the non-piezoelectric substrate 1, the surface acoustic wave is attenuated. Accordingly, it is possible to detect a touch which has been made and the touched position by finding whether the level of the receiving signals of the receiving elements 3 is attenuated. A region indicated by the broken line is a region in which the touched position can be detected (hereinafter referred to as the "detection region 1a"), and a peripheral region of the detection region 1a, where the excitation elements 2 and receiving elements 3 are disposed, is referred to as a "frame region".

In the touch panel device having such a structure, the resolution is determined by the aperture length of the IDT. It is therefore preferred to have a shorter aperture length. However, since there is a correlation between the aperture length and the wavelength of the surface acoustic wave, if the aperture is narrowed, the diffraction effect is suddenly enhanced and it becomes difficult to distinguish the respective tracks along which the surface acoustic waves have been propagated. Furthermore, in order to reduce the aperture, it is necessary to make the wavelength of the surface acoustic wave shorter. In this case, not only a circuit for high frequency is required because of an increase in the frequency resulting from a shorter wavelength, but also attention must be paid to the S/N ratio as the attenuation factor is increased due to scattering or the like.

Accordingly, the present inventor et al. have proposed a touch panel device (hereinafter referred to as the "prior example") in which a plurality of excitation elements and receiving elements are disposed so as to propagate the surface acoustic waves in an oblique direction (diagonal direction) of the non-piezoelectric substrate 1. FIG. 2 is an illustration showing the structure of such a touch panel device. In the structure shown in FIG. 2, a two-dimensional touched position is detected by forming the propagation paths of the surface acoustic waves between the excitation elements 2 and the receiving elements 3 so that the propagation paths are inclined at an angle of 45° with respect to the direction of the respective sides of the non-piezoelectric substrate 1. In this example, even when the size of tracks along which the surface acoustic waves propagate is the same as that of a touch panel device having a structure as shown in FIG. 1, it is possible to improve the resolution of the position by about 1.4 times.

In the above structure, however, since a plurality of excitation elements and receiving elements are arranged into lines, if the diffraction effect is taken into consideration, a wide aperture is necessary due to this structure, and therefore there is a limit in narrowing the size of tracks along which the surface acoustic waves propagate and there is a demand for an improvement.

BRIEF SUMMARY OF THE INVENTION

It is a main object of the present invention to provide a touch panel device capable of significantly improving the accuracy in detecting the position of an object (the resolution of a detected position).

A touch panel device of the first aspect of the present invention is a touch panel device comprising at least one pair of an excitation element for exciting a surface acoustic wave and a receiving element for receiving the surface acoustic wave at peripheral sections in a diagonal direction of a rectangular non-piezoelectric substrate, each of the excitation element and receiving element having an IDT constructed by joining comb-like electrode fingers to facing electrode bases, for detecting a position of an object touching the non-piezoelectric substrate by propagating surface acoustic waves between the excitation element and receiving element in the diagonal direction of the non-piezoelectric substrate and detecting the position based on reception results at the receiving element, wherein the comb-like electrode fingers of the IDTs in the excitation element and receiving element are joined to the electrode bases so that they are inclined from a facing direction of the electrode bases.

In the touch panel device of the first aspect, since the surface acoustic waves are propagated in the diagonal direction of the non-piezoelectric substrate and IDTs in which the comb-like electrode fingers are extended from the electrode bases in a direction shifted from the facing direction of the facing electrode bases are used, it is possible to continuously detect a position touched by a finger or the like, thereby enabling a significant improvement in the resolution of the detected position as compared with the prior example.

A touch panel device of the second aspect of the present invention is based on the first aspect, and the comb-like electrode fingers have an angle of inclination in two directions from the facing direction of the electrode bases. Since the surface acoustic waves in two directions are excited by a single excitation element and/or surface acoustic waves in two directions are received by a single receiving element, it is possible to efficiently perform an exciting process of the surface acoustic waves and/or a receiving process of the surface acoustic waves.

A touch panel device of the third aspect of the present invention is based on the second aspect, and the comb-like electrode fingers are bent. Since the IDTs having the comb-like electrode fingers bent in the middle are used, it is possible to excite and/or receive surface acoustic waves in two directions by a structure of one pair of electrode bases, thereby realizing a narrower frame region.

A touch panel device of the fourth aspect of the present invention is based on the second aspect, and the angle of inclination of the comb-like electrode fingers is set according to an aspect ratio of a size of an object position detection region in the non-piezoelectric substrate. Since the angle of inclination of the comb-like electrode fingers in the IDTs is set according to the aspect ratio of the detection region, it is possible to achieve a one-to-one surface acoustic wave exciting and receiving relation.

A touch panel device of the fifth aspect of the present invention is based on any one of the first through fourth aspects, and the IDTs related to surface acoustic waves propagating outside of the object position detection region are eliminated. Since the IDTs related to surface acoustic waves which do not propagate in the detection region are eliminated, it is possible to realize an efficient IDT arrangement without waste, improve the detection accuracy by eliminating the influence of noise, and reduce the frame region.

A touch panel device of the sixth aspect of the present invention is based on any one of the first through fifth aspects, and a plurality of pairs of the excitation element and receiving element are provided and a frequency of the IDTs in each pair is different from that in other pair. Since a frequency in a pair of the excitation element and receiving element is made different from a frequency in other pair of the excitation element and receiving element, it is possible to prevent a lowering of the S/N ratio due to overlapping of the surface acoustic waves.

The above and further objects and features of the invention will more fully be apparent from the following detailed description with accompanying drawings.

DETAILED DESCRIPTION OF THE INVENTION

Figure 1:
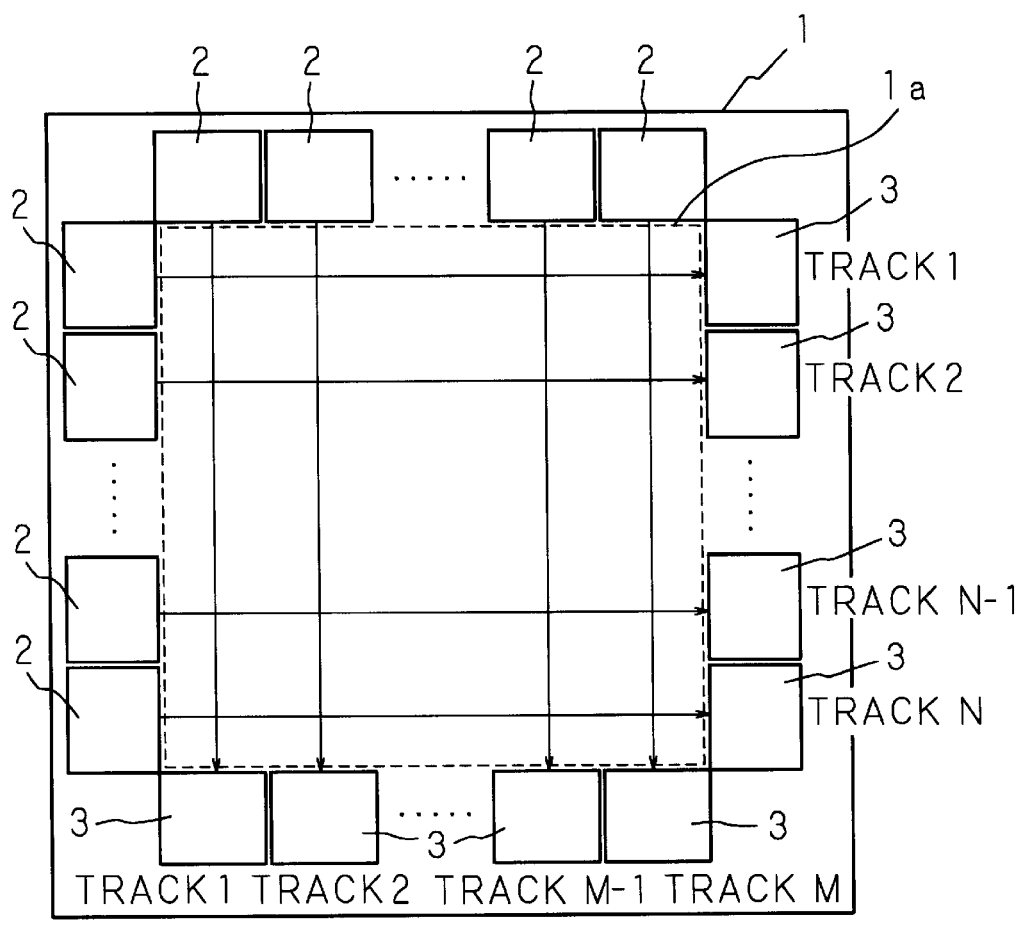
FIG. 1 is an illustration showing the structure of a conventional touch panel device.
Figure 2:
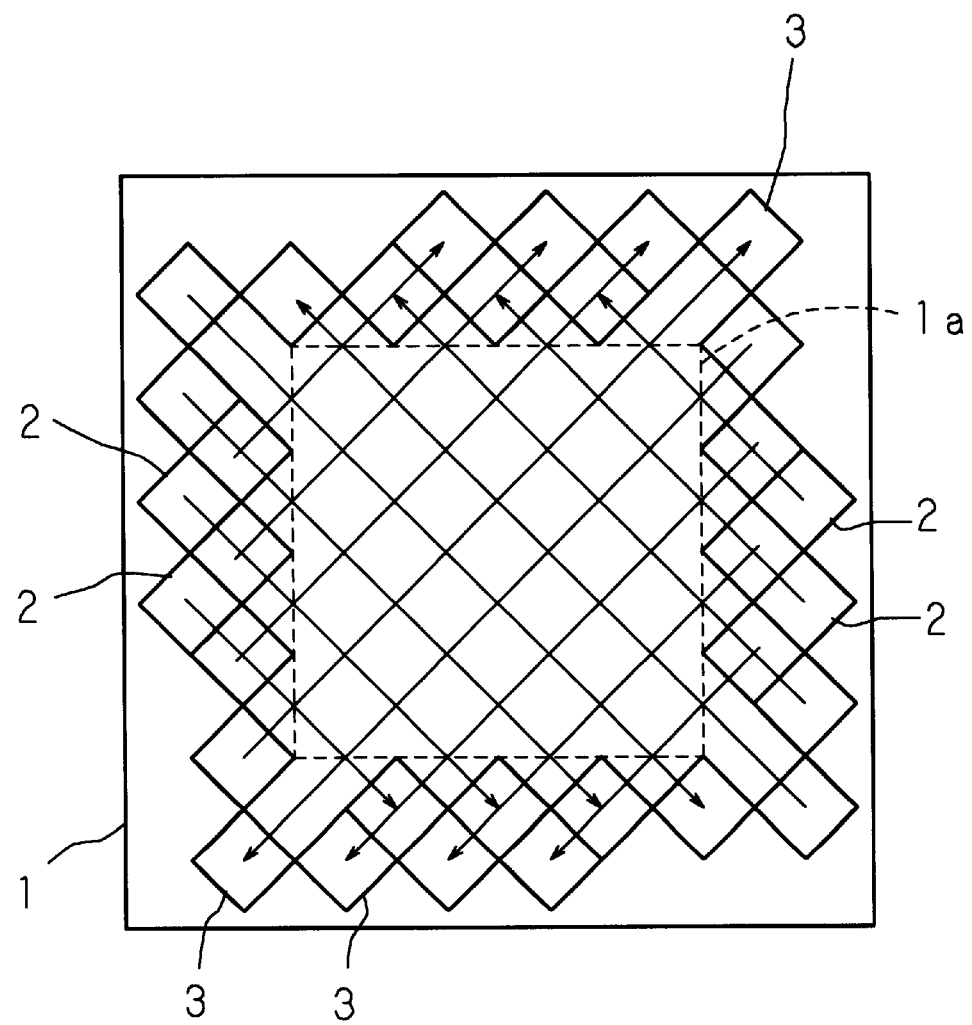
FIG. 2 is an illustration showing the structure of a touch panel device according to the prior example.
Figure 3:
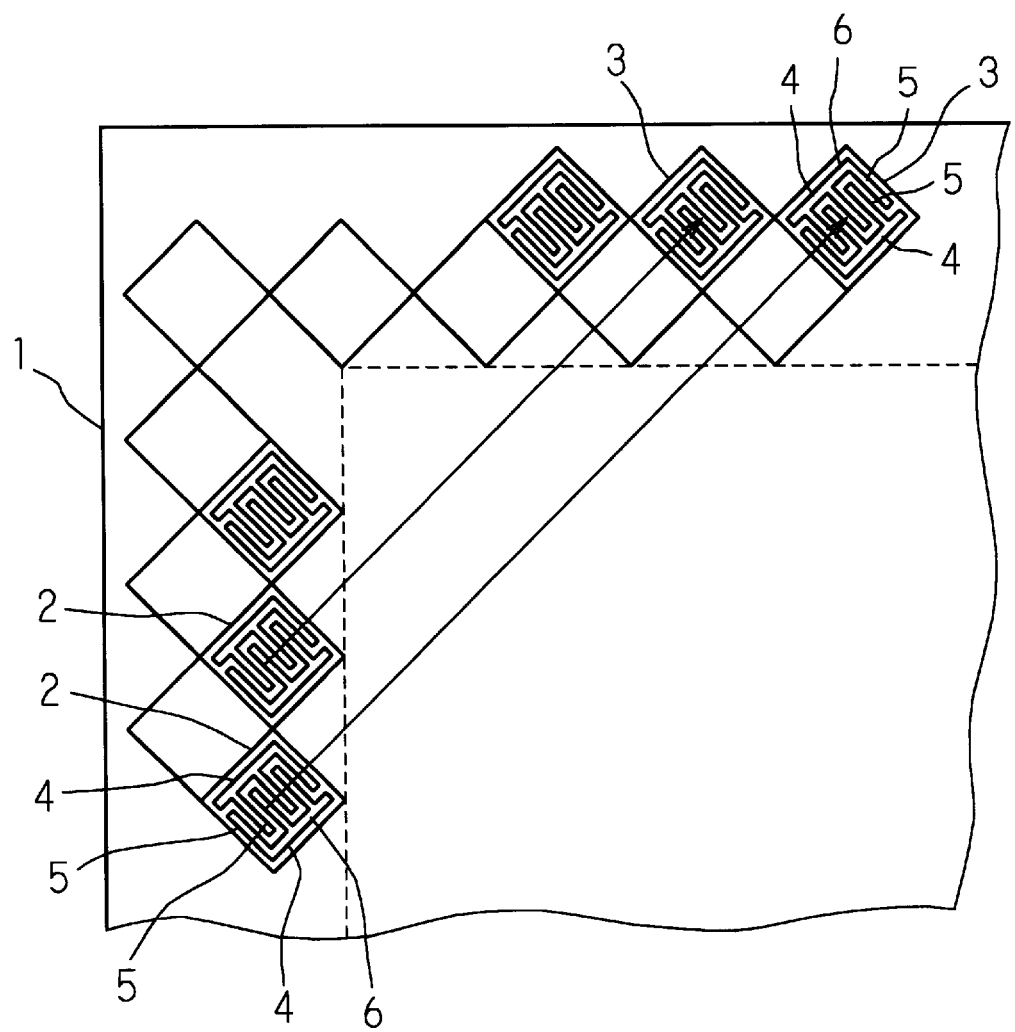
FIG. 3 is an illustration showing the structure of IDTs according to the prior example.

The following description will explain the structure of a touch panel device of the present invention in comparison with the prior example. FIG. 3 is an illustration showing the structure of IDTs according to the above-described prior example. Each of a plurality of excitation elements 2 arranged into a line at one peripheral section of a rectangular non-piezoelectric substrate 1 has an IDT 6 comprising facing electrode bases 4 and a plurality of comb-like electrode fingers 5 extended from the electrode bases 4 alternately. Besides, each of a plurality of receiving elements 3 arranged into a line at an adjacent peripheral section of the non-piezoelectric substrate 1 has an IDT 6 having the same structure as that of the excitation element 2. In each IDT 6, each comb-like electrode finger 5 is extended from the electrode base 4 in the same direction as the facing direction of the electrode bases 4, i.e., in a direction perpendicular to the surfaces of the respective electrode bases 4. In such a structure, a surface acoustic wave is excited by the excitation element 2 (IDT 6), and the excited surface acoustic wave is propagated in a diagonal direction of the non-piezoelectric substrate 1 and received by the receiving element 3 (IDT 6).

Figure 5:
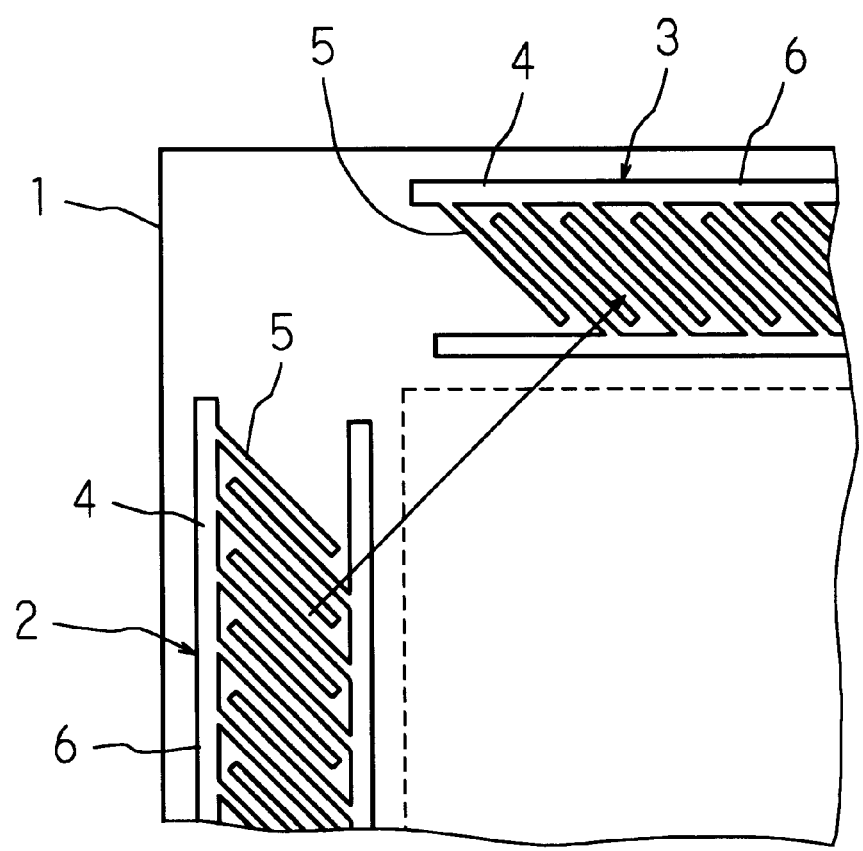
FIG. 5 is an illustration showing the structure of IDTs in a touch panel device of the present invention.

FIG. 5 is an illustration showing the structure of IDTs in a touch panel device of the present invention. An excitation element 2 is disposed at one peripheral section of a rectangular non-piezoelectric substrate 1. This excitation element 2 has an IDT 6 comprising facing electrode bases 4 and a plurality of comb-like electrode fingers 5 extended from the electrode bases 4 alternately. Moreover, a receiving element 3 disposed at an adjacent peripheral section of the non-piezoelectric substrate 1 has an IDT 6 having the same structure as that of the excitation element 2. In each IDT 6, each comb-like electrode finger 5 is extended from the electrode base 4 in a direction inclined from the facing direction of the electrode bases 4, i.e., in such a manner that the electrode finger 5 is inclined from a direction perpendicular to the surfaces of the respective electrode bases 4.

In such a structure, a surface acoustic wave is excited by the excitation element 2 (IDT 6), and the excited surface acoustic wave is propagated in a diagonal direction of the non-piezoelectric substrate 1 and received by the receiving element 3 (IDT 6). At this time, the wave front of the whole surface acoustic waves excited by the IDT 6 is oblique to the inclined direction of the comb-like electrode fingers 5, but the propagating direction is a direction orthogonal to an aperture of the IDT 6. Therefore, the center of excitation in a timing is the center position of a plurality of comb-like electrode fingers 5 through which the surface acoustic waves orthogonal to the aperture pass. Further, the aperture width contributing to this detection is twice the crossing width.

Figure 4:
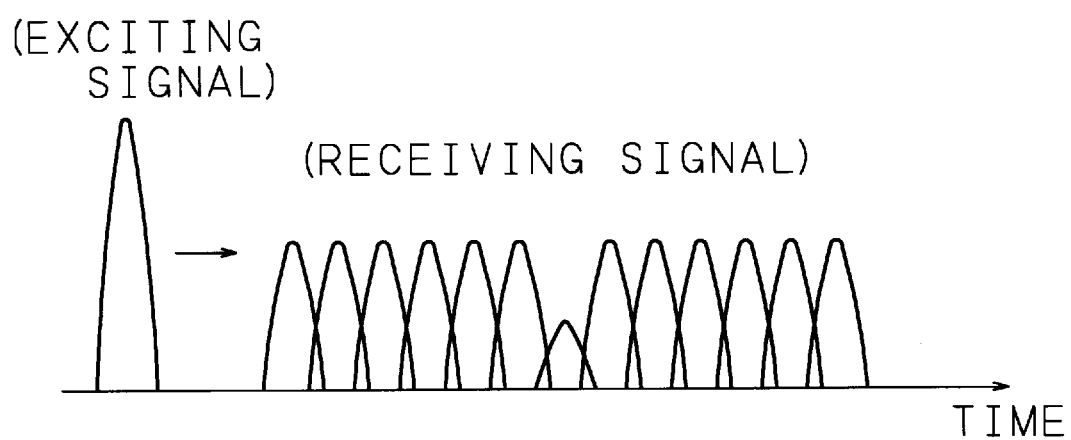
FIG. 4 is an illustration showing one example of the waveforms of an exciting signal and a receiving signal in position detection according to the prior example.

FIG. 4 is an illustration showing one example of the waveforms of an exciting signal and a receiving signal in position detection according to the prior example. Since the receiving signal corresponding to a position touched by a finger or the like is attenuated, it is possible to detect the position. However, since a plurality of excitation elements 2 and receiving elements 3 are discretely arranged stepwise, the detection is performed digitally, the improvement of the resolution which is prescribed by the aperture width as a constant width is limited, and there is a problem that an interpolation process must be performed for a position between adjacent tracks by using the level of receiving signals at both of the tracks.

Figure 6:
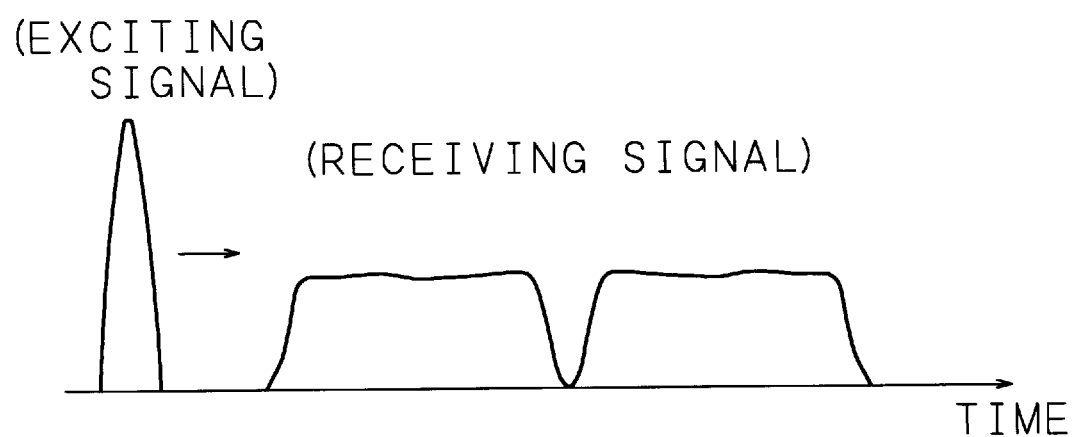
FIG. 6 is an illustration showing one example of the waveforms of an exciting signal and a receiving signal in position detection by a touch panel device of the present invention.

FIG. 6 is an illustration showing one example of the waveforms of an exciting signal and a receiving signal in position detection by a touch panel device of the present invention. In the example of the present invention shown in FIG. 5, since the comb-like electrode fingers 5 are extended in a direction inclined from the facing direction of the electrode bases 4, i.e., the apertures are gradually shifted, it is possible to detect a position touched by a finger or the like continuously (in an analog manner), thereby significantly improving the resolution of the detected position as compared with the prior example and eliminating the necessity of performing the interpolation process which is executed in the prior example.

Figure 7:
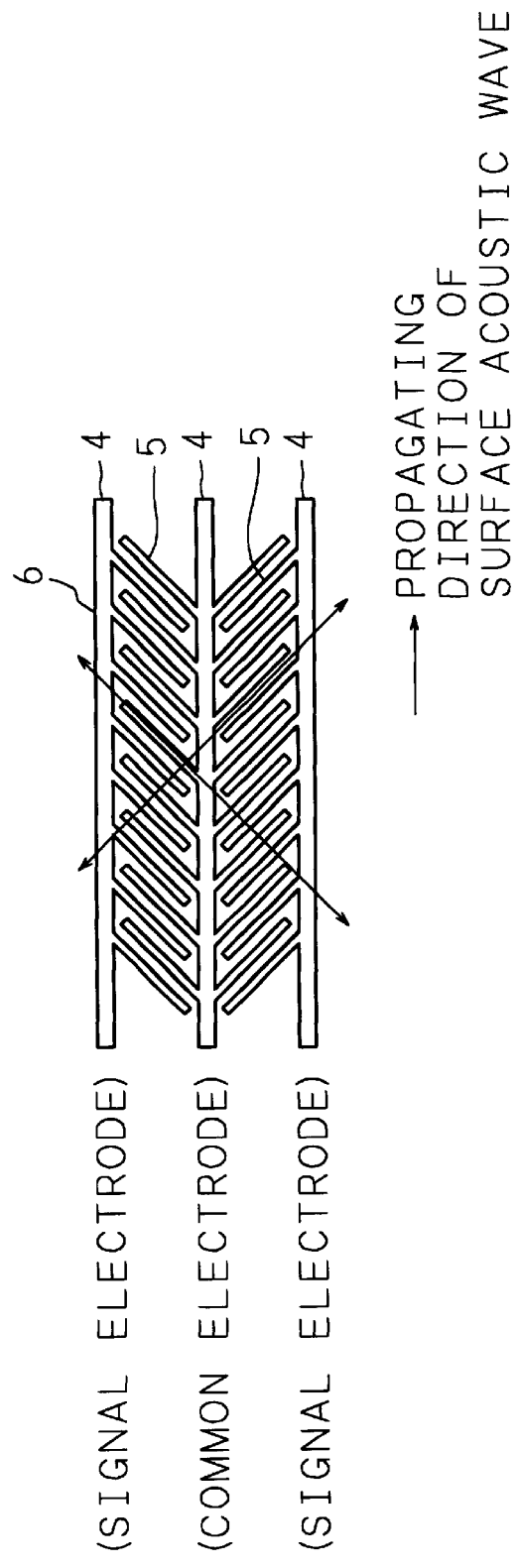
FIG. 7 is an illustration showing a structural example of the IDT according to the second aspect.
Figure 8:
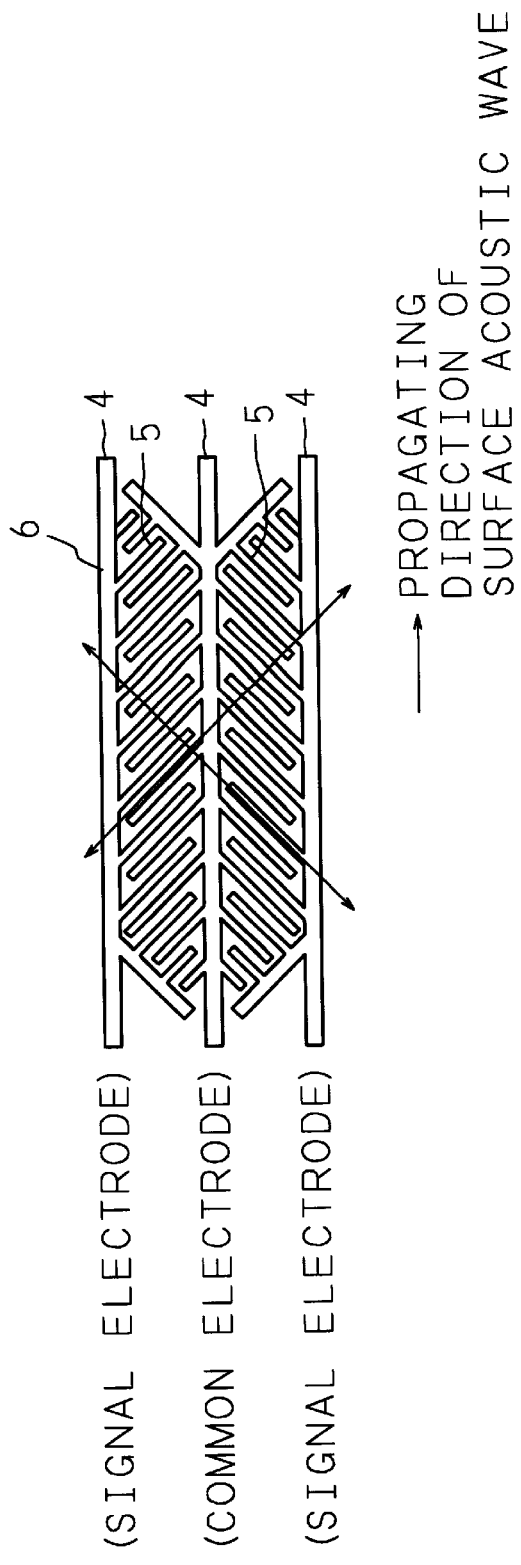
FIG. 8 is an illustration showing a structural example of the IDT according to the second aspect.

FIGS. 7 and 8 are illustrations showing the structure of the IDT 6 according to examples of the second aspect of the present invention, i.e., examples in which surface acoustic waves in two directions are excited by a single excitation element 2 (or surface acoustic waves in two directions are received by a single receiving element 3).

In the example shown in FIG. 7, one electrode base 4 as a common electrode is provided at the center, two electrode bases 4 as signal electrodes are positioned to sandwich the common electrode, and a plurality of comb-like electrode fingers 5 are extended from the electrode bases 4 alternately between two pairs of the electrode bases 4 (between the signal electrodes and the common electrode) in such a manner that the comb-like electrode fingers 5 are inclined from the facing direction of the electrode bases 4. By simultaneously applying driving signals to the respective electrode bases 4 as the signal electrodes, the surface acoustic waves are excited in the respective aperture directions, or the surface acoustic waves are received from the respective aperture directions. Note that, when the driving signals are applied in different timings, it is possible to switch the propagating directions of the surface acoustic waves.

In the example shown in FIG. 8, the aperture face of the IDT 6 is reversed from the example of FIG. 7. In this example, since the surface acoustic wave passes through the same number of the comb-like electrode fingers 5 at any position, it is possible to excite or receive the surface acoustic waves of the same level in any region.

Figure 9:
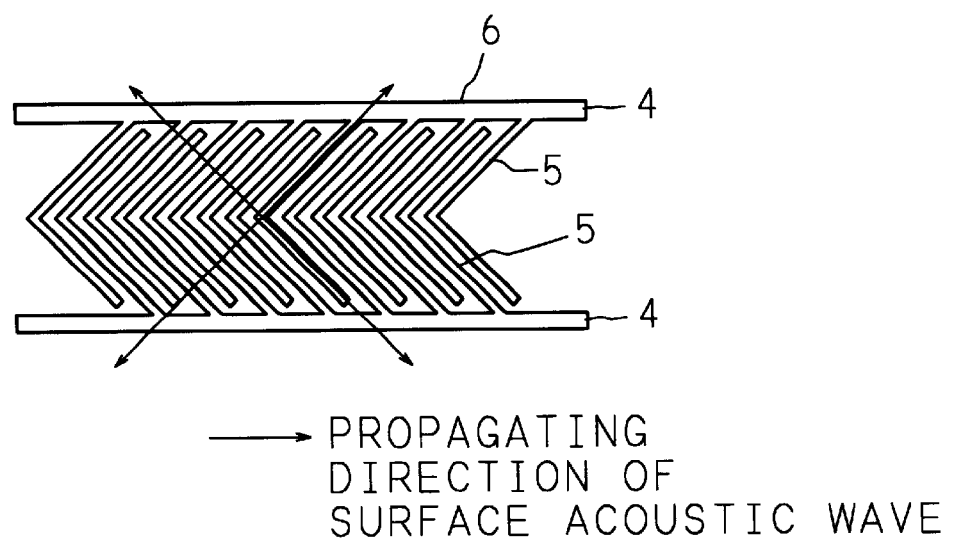
FIG. 9 is an illustration showing a structural example of the IDT according to the third aspect.

FIG. 9 is an illustration showing the structure of the IDT 6 according to an example of the third aspect of the present invention, i.e., an example in which surface acoustic waves in two directions are excited by one pair of electrode base structures, or surface acoustic waves in two directions are received by one receiving element.

In the example shown in FIG. 9, the comb-like electrode fingers 5 are extended alternately from the facing electrode bases 4 and the respective comb-like electrode fingers 5 are bent in the middle, thereby forming lines of the comb-like electrode fingers 5 inclined in two directions from the facing direction of the electrode bases 4 and realizing excitation of surface acoustic waves in two directions or reception of surface acoustic waves from two directions. In this example, since the number of the electrode bases can be reduced as compared with the examples in FIGS. 7 and 8, it is possible to narrow the frame region.

Figure 10C:
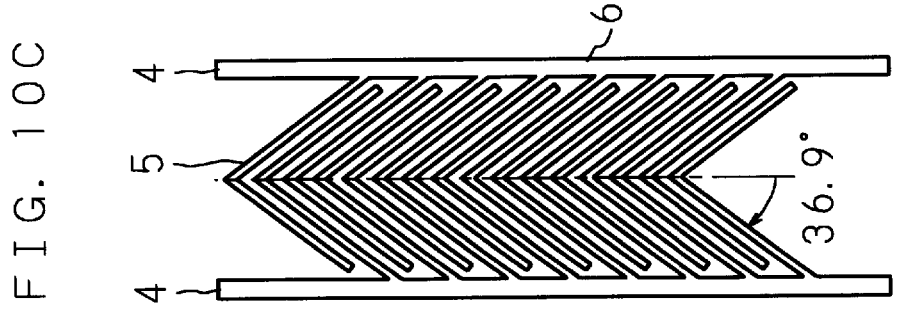
FIGS. 10B and 10C are illustrations showing structural examples of the IDT according to the fourth aspect.
Figure 10A:
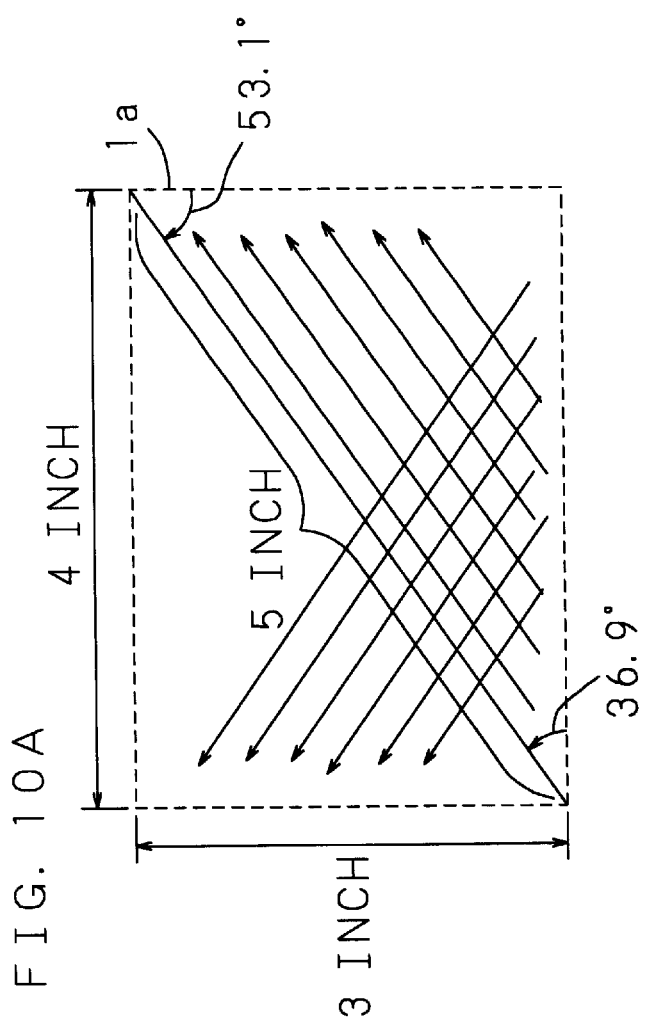
FIG. 10A is an illustration showing a detection region according to the fourth aspect.

FIGS. 10A thorough 10C are illustrations showing an example according to the fourth aspect of the present invention. The detection region 1*a* of the non-piezoelectric substrate 1 indicated by the broken line in FIG. 10A has a size of 3 inches in height, 4 inches in width and 5 inches in diagonal, and the detection region 1*a* has an aspect ratio of 3:4. In this example, the bent angle of the comb-like electrode fingers 5 of the bent-type IDT 6 shown in FIG. 9 is set according to this aspect ratio.

Figure 10B:
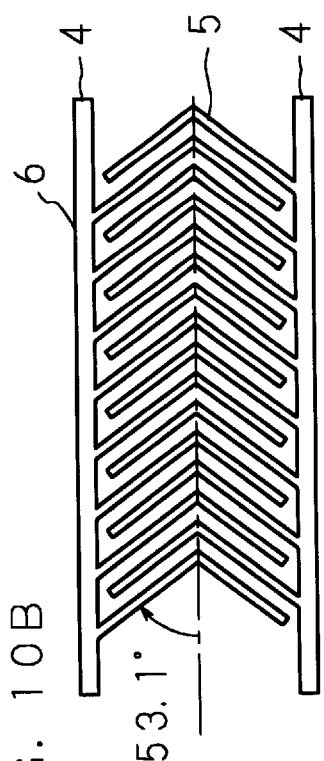

More specifically, in the IDT 6 disposed on a longer side, as shown in FIG. 10B, the comb-like electrode fingers 5 are bent at an angle of 53.1° (4/5=sin 53.1°) with the axis center direction; and in the IDT 6 disposed on a shorter side, as shown in FIG. 10C, the comb-like electrode fingers 5 are bent at an angle of 36.9° (3/5=sin 36.9°) with the axis center direction). By bending the comb-like electrode fingers 5 in this manner, it is possible to achieve a one-to-one surface acoustic wave exciting and receiving relation.

Figure 11:
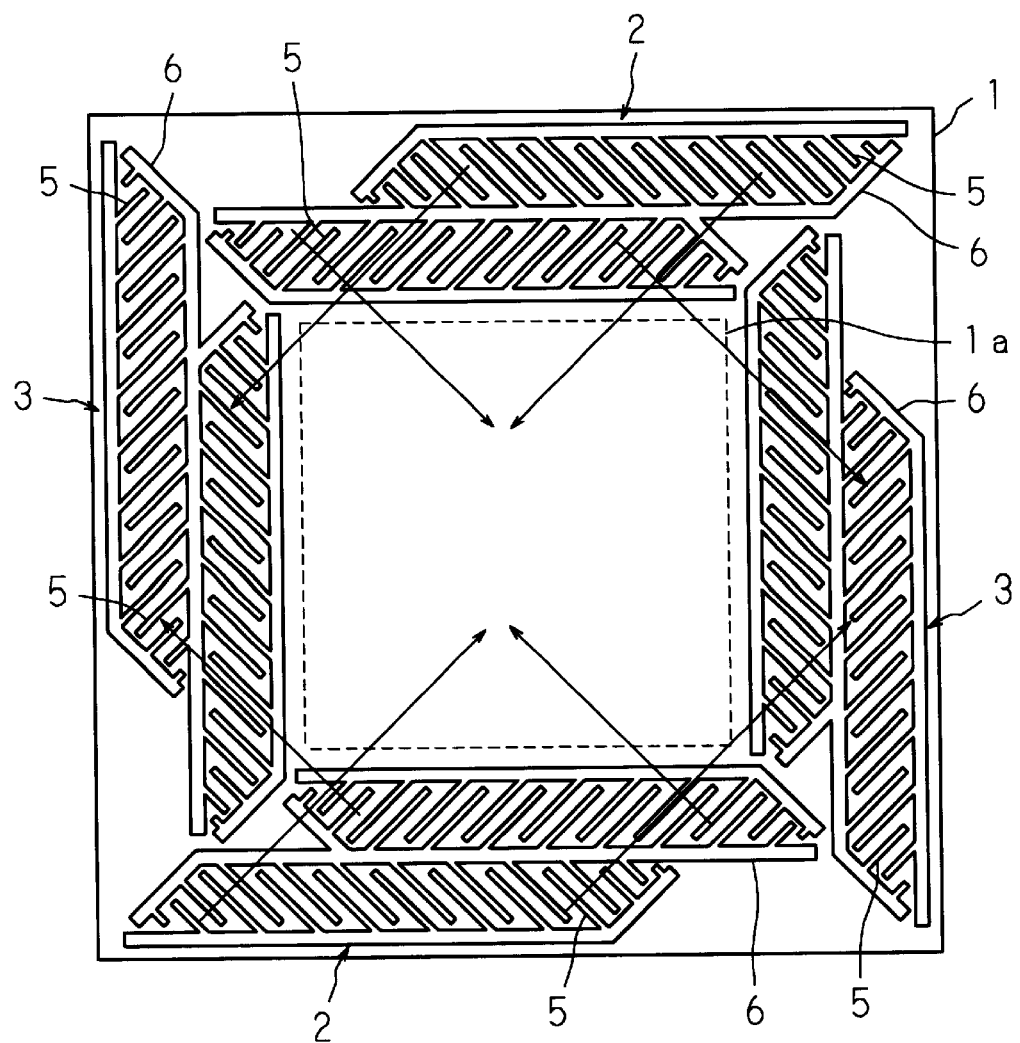
FIG. 11 is an illustration showing an example of arrangement of excitation elements (IDTs) and receiving elements (IDTs) according to the fifth aspect.

FIG. 11 is an illustration showing an example of arrangement of excitation elements 2 (IDTs 6) and receiving elements 3 (IDTs 6) according to the fifth aspect of the present invention, i.e., an example of preferred arrangement thereof. Portions of the IDTs 6 related to surface acoustic waves which do not contribute to detection of an object, i.e., surface acoustic waves which do not propagate in the detection region 1a of the non-piezoelectric substrate 1, are eliminated. By modifying the above-described IDT 6 shown in FIG. 8, i.e., shifting the position of forming the comb-like electrode fingers 5 in both sides, an efficient arrangement of the IDTs 6 without waste is realized. With such an arrangement, it is possible to reduce the frame region.

Figure 12:
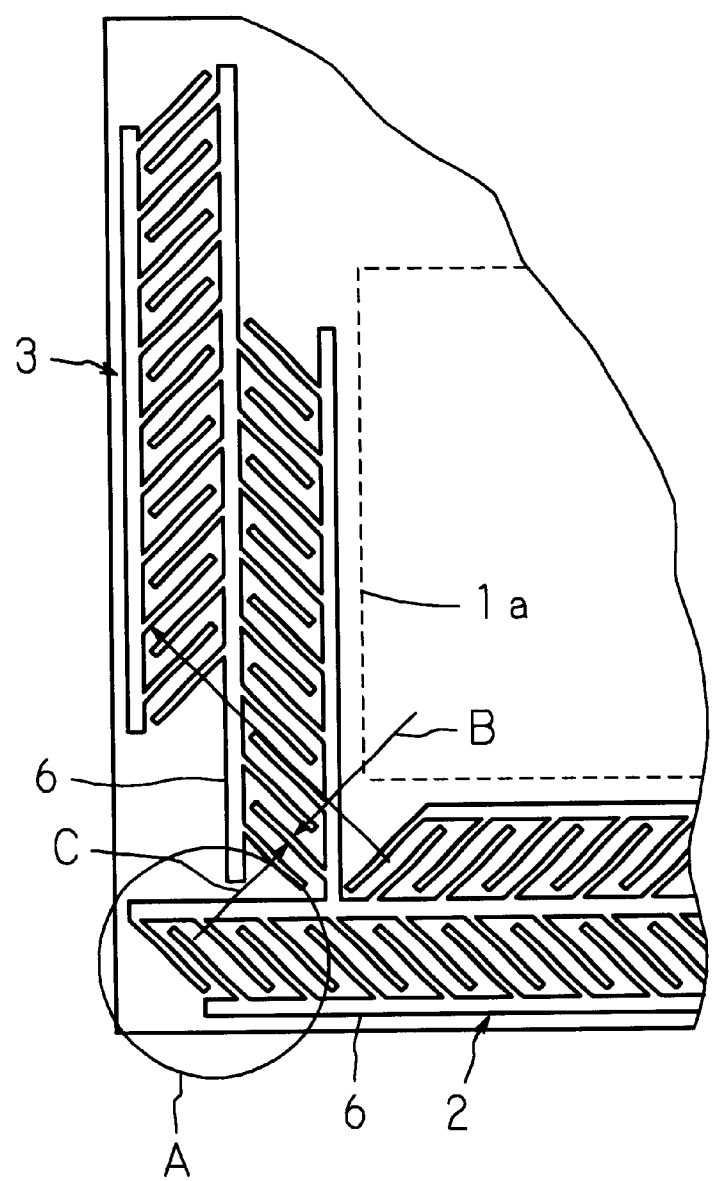
FIG. 12 is an illustration showing a problem in an example of arrangement of excitation elements (IDTs) and receiving elements (IDTs)

Moreover, by adopting a structure as shown in FIG. 11, it is possible to improve the detection accuracy. For example, if the IDTs 6 are arranged as shown in FIG. 12 in the periphery of a corner of the detection region 1a, the following problem arises. Since the IDT 6 of the excitation element 2 is extended to a position covering the IDT 6 of the receiving element 3 (a portion indicated by A), the IDT 6 of the receiving element 3 which is intended to receive a surface acoustic wave (arrow sign B) propagated in the detection region 1a receives a surface acoustic wave (arrow sign C) excited by the IDT 6 of adjacent exciting element 2. As a result, this received component produces noise, and accurate position detection can not be performed. An arrangement as shown in FIG. 11 does not have such a problem and can obtain accurate position detection results.

Specific examples of the present invention will be explained below.

(First Embodiment)

Figure 13:
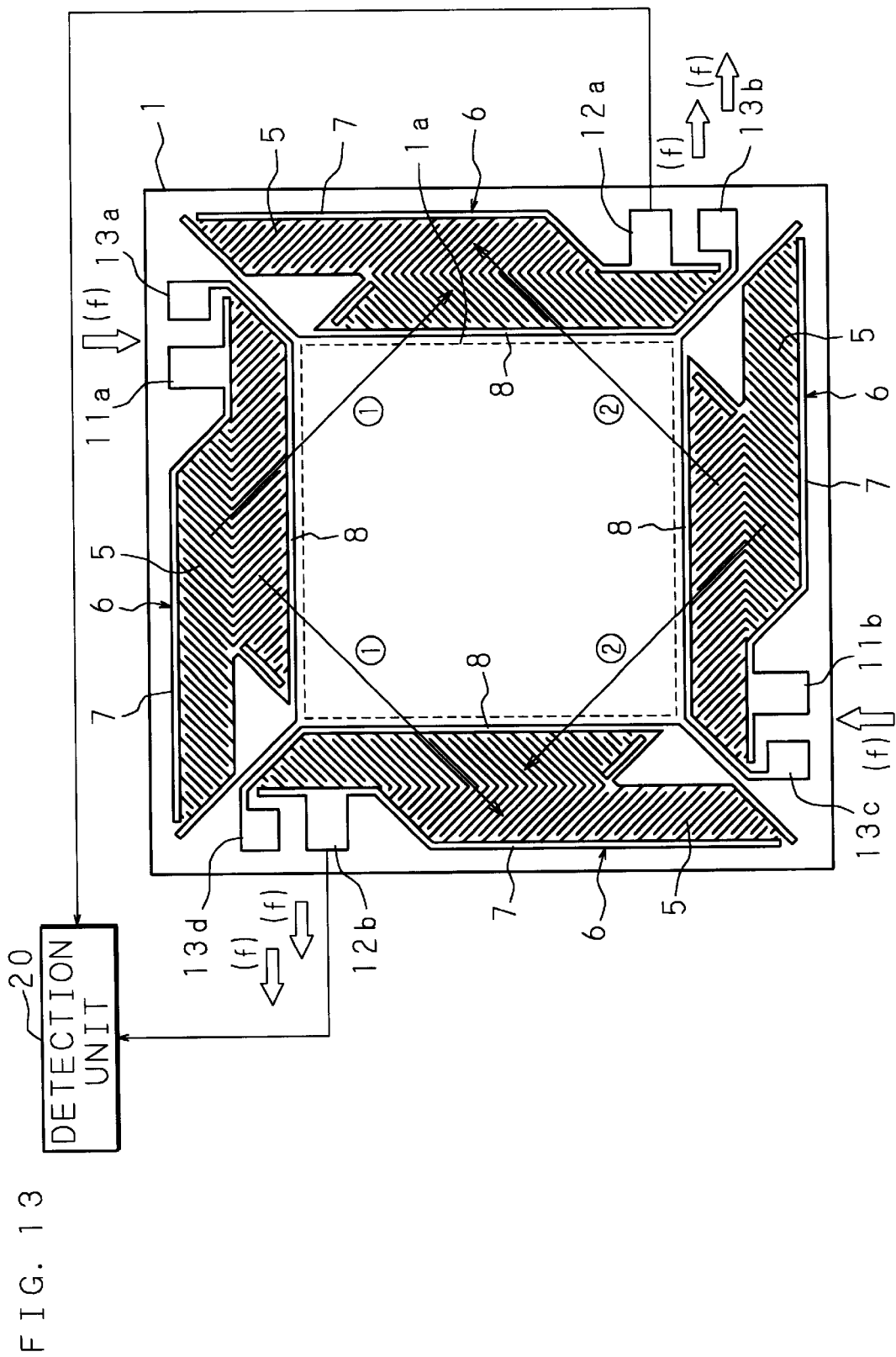
FIG. 13 is an illustration showing the basic structure of a touch panel device according to the first embodiment.

FIG. 13 is an illustration showing the basic structure of a touch panel device according to the first embodiment of the present invention. In FIG. 13, numeral 1 represents a rectangular non-piezoelectric substrate 1 made of a glass material, for example, and a center section enclosed by the broken line is a detection region 1a. In a frame region located outside of the detection region 1a as a peripheral section of the non-piezoelectric substrate 1, four IDTs 6 having a structure similar to the above-described structure shown in FIG. 9 are disposed. In the first embodiment, the IDTs 6 disposed on the upper side and lower side function as excitation elements for exciting surface acoustic waves (frequency: f) in two different directions simultaneously, while the IDTs 6 positioned on the left side and right side function as receiving elements for receiving the surface acoustic waves (frequency: f) from two different directions.

In the first embodiment, electrode wiring is provided independently for each of the IDTs 6 on the upper, lower, left and right sides. An input terminal 11a and a ground terminal 13a for the upper-side IDT 6 are provided at the right end of the upper side of the non-piezoelectric substrate 1. Similarly, an input terminal 11b and a ground terminal 13c for the lower-side IDT 6, an output terminal 12a and a ground terminal 13b for the right-side IDT 6, and an output terminal 12b and a ground terminal 13d for the left-side IDT 6 are provided at the left end of the lower side, the lower end of the right side and the upper end of the left side, respectively. The output terminal 12a and 12b are connected to a detection unit 20 for detecting a position touched by an object based on the receiving outputs from both of the output terminals 12a and 12b.

The input terminal 11a is connected to a signal electrode 7 of the upper-side IDT 6. Similarly, the input terminal 11b, output terminal 12a and output terminals 12b are connected to the signal electrodes 7 of the lower-side, right-side and left-side IDTs 6, respectively. The ground terminal 13a is connected to a ground electrode 8 of the upper-side IDT 6. Likewise, the ground terminals 13b, 13c and 13d are connected to the ground electrodes 8 of the right-side, lower-side and left-side IDTs 6, respectively.

Figure 14:
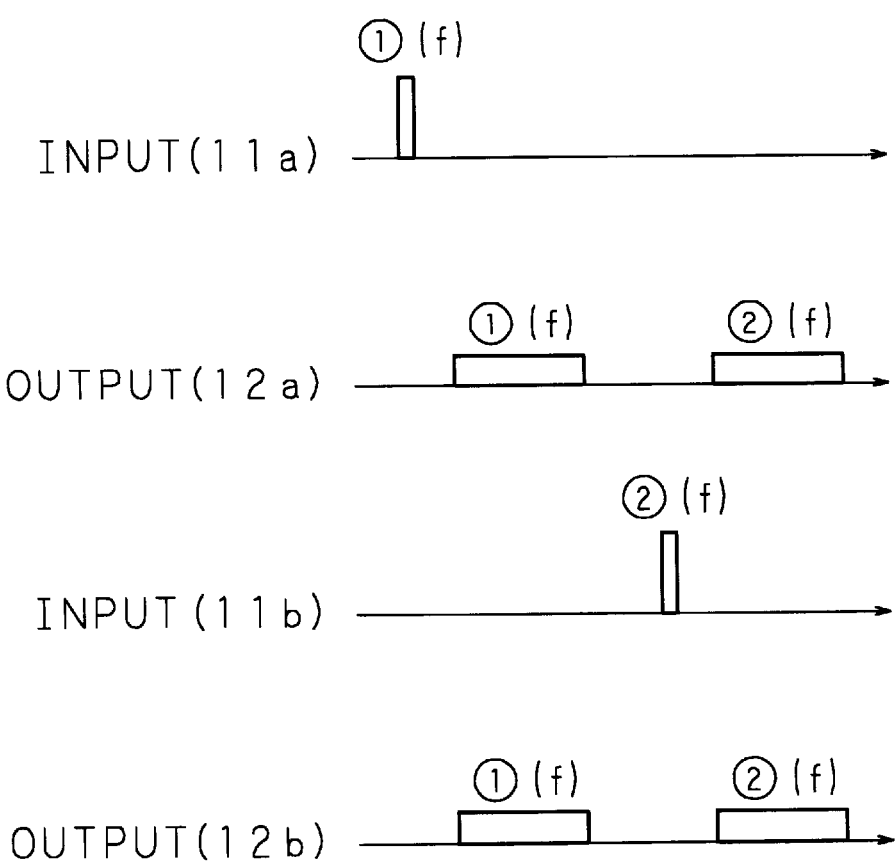
FIG. 14 is an illustration showing an example of surface acoustic wave exciting/receiving signals according to the first embodiment.

Next, the following description will explain the operation of a touch panel device having such a structure (frequency-fixed two-input two-output type). FIG. 14 shows an example of the surface acoustic wave exciting/receiving signals. The input terminal 11a is driven at the frequency f to excite the surface acoustic waves of the frequency f in two directions from the upper-side IDT 6, this surface acoustic waves of the frequency f are received by the right-side and left-side IDTs 6 (①, ①), and the receiving outputs are fetched from the output terminals 12a and 12b. Next, the input terminal 11b is driven at the same frequency f to excite the surface acoustic waves of the frequency f in two directions from the lower-side IDT 6. These surface acoustic waves of the frequency f are received by the right-side and left-side IDTs 6 (②, ②), and the receiving outputs are fetched from the output terminals 12a and 12b. The fetched receiving outputs are input to the detection unit 20, and the position touched by the object is detected based on the receiving outputs.

In this first embodiment, since only the surface acoustic waves of one kind of frequency f are used, it is not necessary to provide a plurality of kinds of IDTs 6 having comb-like electrode fingers 5 formed at different pitches, thereby simplifying the device structure.

Figure 15A:
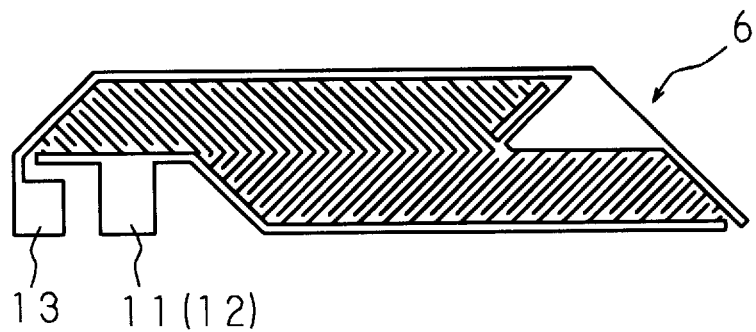
FIGS. 15A, 15B and 15C are illustrations showing examples of configuration of the IDT.
Figure 15B:
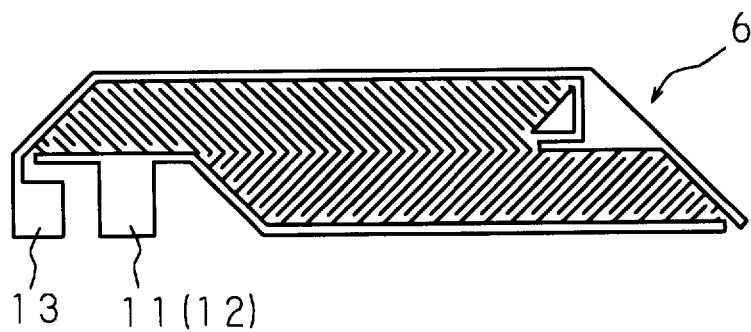
Figure 15C:
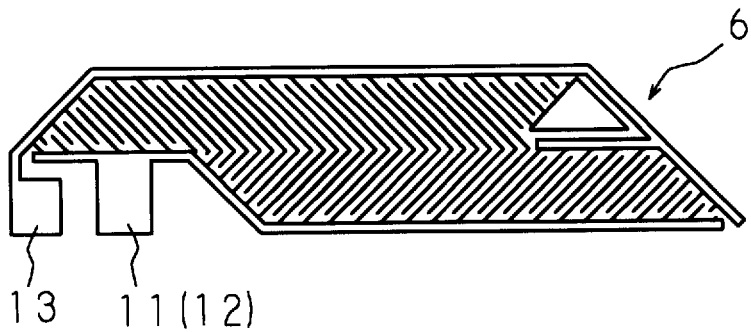

FIGS. 15A through 15C are illustrations showing examples of configuration of the IDT 6 disposed at each peripheral section of the touch panel device in relation to its terminals (the input terminal 11 (or output terminal 12) and the ground terminal 13). Note that, the example of FIG. 15A illustrates a structural example according to the above-described first embodiment. In any of these structural examples, by arranging four IDTs 6 in a circular form as shown in FIG. 13, the entire area of the detection region 1a of the touch panel device can be scanned completely with surface acoustic waves, and the surface acoustic waves can never be excited/received redundantly at the corner sections of the detection region 1a.

(Second Embodiment)

Figure 16:
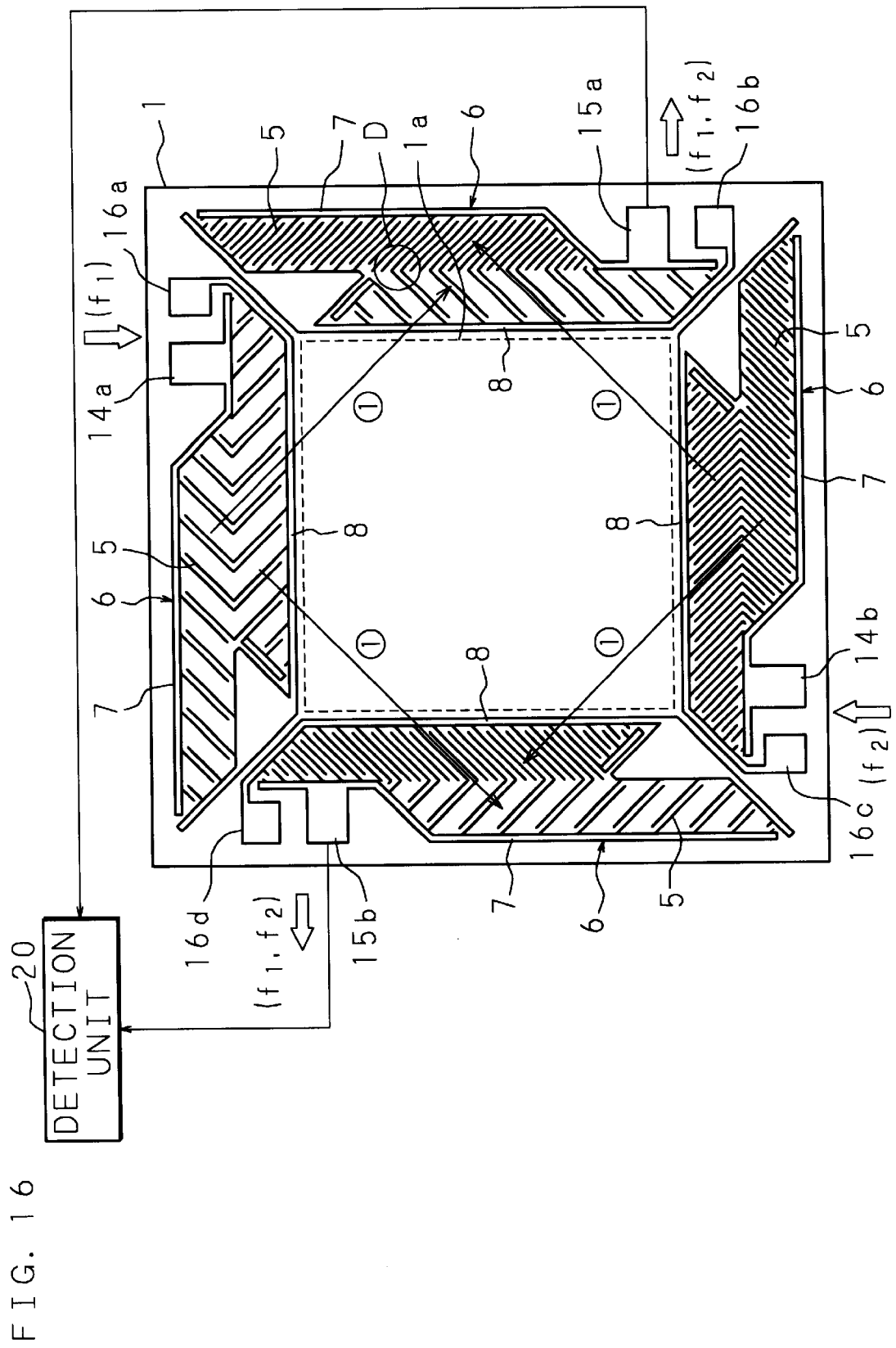
FIG. 16 is an illustration showing the basic structure of a touch panel device according to the second embodiment.
Figure 17:
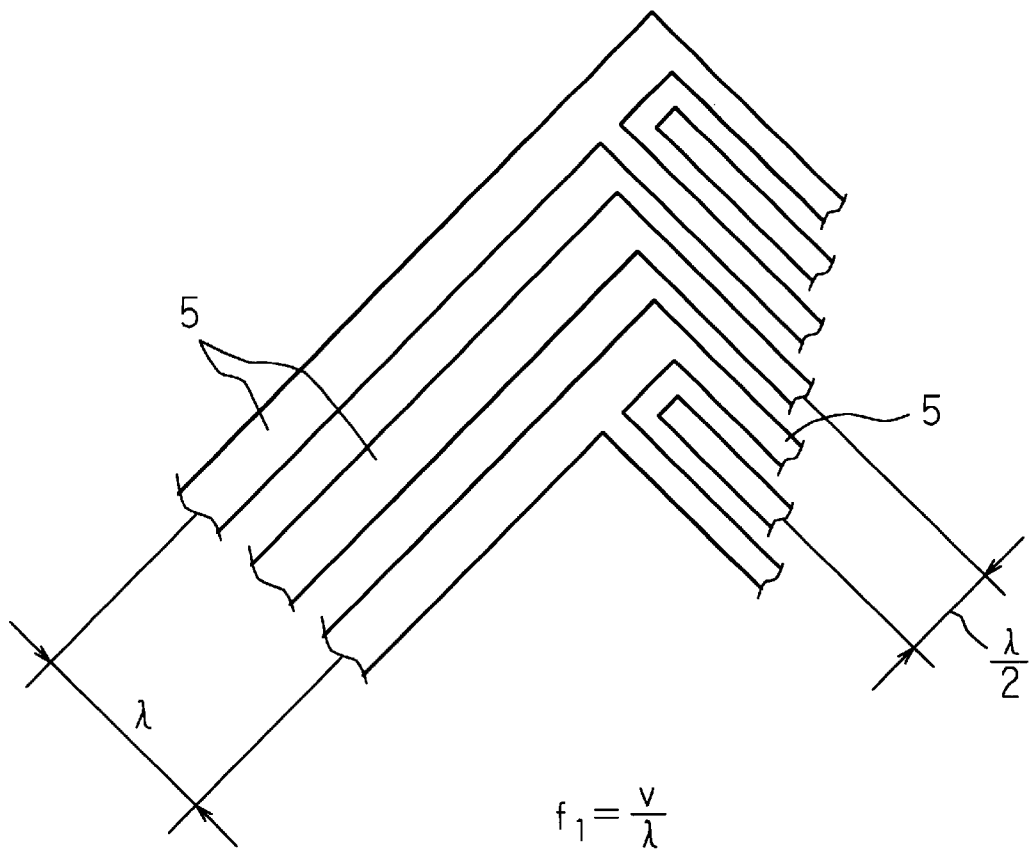
FIG. 17 is an enlarged view of a portion indicated by D in FIG. 16.

FIG. 16 is an illustration showing the basic structure of a touch panel device according to the second embodiment of the present invention. In FIG. 16, four IDTs 6 are disposed in the frame region of the detection region 1a located at the center of the rectangular non-piezoelectric substrate 1 made of a glass material. In this second embodiment, like the first embodiment, the IDTs 6 disposed on the upper side and lower side function as excitation elements for exciting surface acoustic waves in two different directions simultaneously and the IDTs 6 positioned on the left side and right side function as receiving elements for receiving the surface acoustic waves from two different directions. However, the pitch of forming the comb-like electrode fingers 5 in both side portions of the upper-side IDT 6, the outer side portion of the left-side IDT 6 and the inner side portion of the right-side IDT 6 is different from the pitch in both side portions of the lower-side IDT 6, the outer side portion of the right-side IDT 6 and the inner side portion of the left-side IDT 6, and the frequency of the surface acoustic waves excited/received in the former portions is $f_1$ and the frequency in the latter portions is $f_2$. FIG. 17 is an enlarged view of a portion indicated by D in FIG. 16. The pitch of forming the comb-like electrode fingers 5 in the inner side portion of the right-side IDT 6 is λ, and the pitch of forming the comb-like electrode fingers 5 in the outer side portion of the right-side IDT 6 is λ/2. Therefore, if the propagation velocity of the surface acoustic wave is v, then $f_1=v/\lambda$, and $f_2=v/(\lambda/2)=2v/\lambda=2f_1$.

Moreover, in this second embodiment, like the first embodiment, electrode wiring is provided independently for each of the four IDTs 6. More specifically, an input terminal 14a and a ground terminal 16a for the upper-side IDT 6 are provided at the right end of the upper side of the non-piezoelectric substrate 1. Similarly, an input terminal 14b and a ground terminal 16c for the lower-side IDT 6, an output terminal 15a and a ground terminal 16b for the right-side IDT 6, and an output terminal 15b and a ground terminal 16d for the left-side IDT 6 are provided at the left end of the lower side of the non-piezoelectric substrate 1, the lower end of the right side, and the upper end of the left side, respectively. The input terminal 14a is connected to the signal electrode 7 of the upper-side IDT 6. Similarly, the input terminal 14b, the output terminal 15a and the output terminal 15b are connected to the signal electrodes 7 of the lower-side, right-side and left-side IDTs 6, respectively. The ground terminal 16a is connected to the ground electrode 8 of the upper-side IDT 6. Likewise, the ground terminals 16b, 16c and 16d are connected to the ground electrodes 8 of the right-side, lower-side and left-side IDTs 6, respectively.

Next, the following description will explain the operation of a touch panel device having such a structure (two-frequency simultaneous two-input two-output type). In this example, two frequencies, $f_1$ and $f_2$, are used so that the surface acoustic wave propagating from the outer side portion of the upper-side IDT 6 to the inner side portion of the right-side IDT 6 has the frequency $f_1$, and the surface acoustic wave propagating from the inner side portion of the lower-side IDT 6 to the outer side portion of the right-side IDT 6 and the surface acoustic wave propagating from the outer side portion of the lower-side IDT 6 to the inner side portion of the left-side IDT 6 have the frequency $f_2$.

Figure 18:
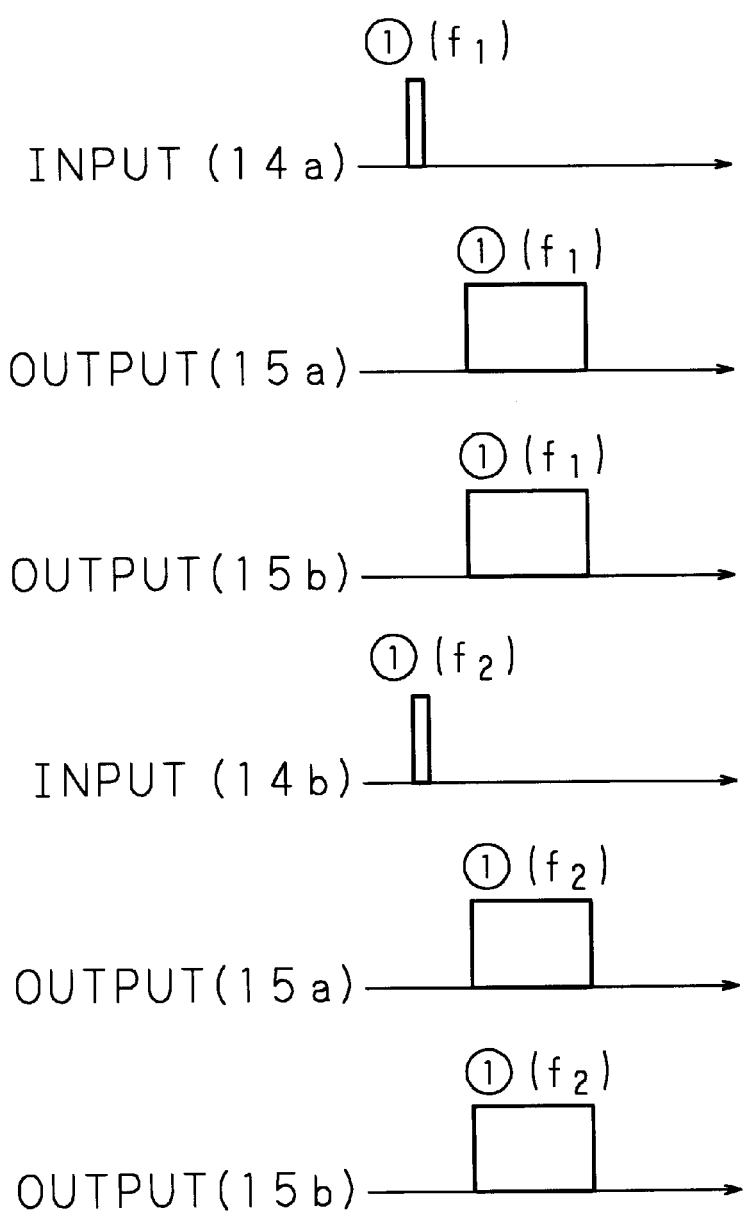
FIG. 18 is an illustration showing an example of surface acoustic wave exciting/receiving signals according to the second embodiment.

FIG. 18 shows an example of surface acoustic wave exciting/receiving signals. The input terminals 14a and 14b are simultaneously driven at the frequencies $f_1$ and $f_2$, respectively, so that the surface acoustic waves of the frequency $f_1$ are excited in two directions from the upper-side IDT 6 and received by the inner side portion of the right-side IDT 6 and the outer side portion of the left-side IDT 6 (①, ①), and the receiving outputs are fetched from the output terminals 15a and 15b; while the surface acoustic waves of the frequency $f_2$ are excited in two directions from the lower-side IDT 6 and received by the outer side portion of the right-side IDT 6 and the inner side portion of the left-side IDT 6 (①, ①), and the receiving outputs are fetched from the output terminals 15a and 15b. The fetched receiving outputs are input to the detection unit 20, and the position touched by the object is detected based on the receiving outputs.

In this second embodiment, since a position detection is executed in one timing, it is possible to carry out the operation quickly and simply.

Moreover, in the first and second embodiments, since the electrode wiring is provided independently for each IDT 6, there are advantages that a measure to prevent noise is taken independently for each surface acoustic wave and noise processing is readily carried out.

(Third Embodiment)

Figure 19:
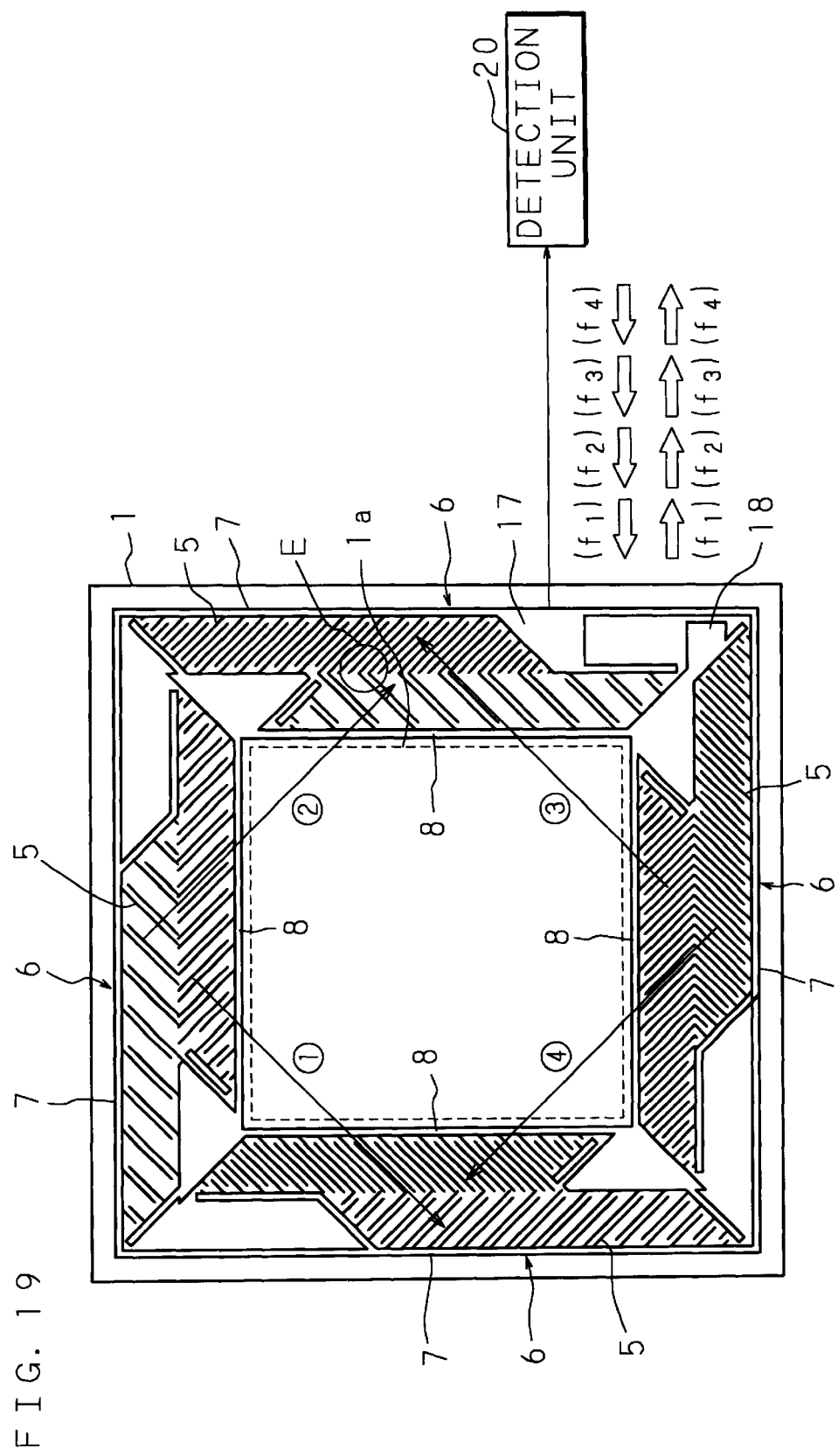
FIG. 19 is an illustration showing the basic structure of a touch panel device according to the third embodiment.
Figure 20:
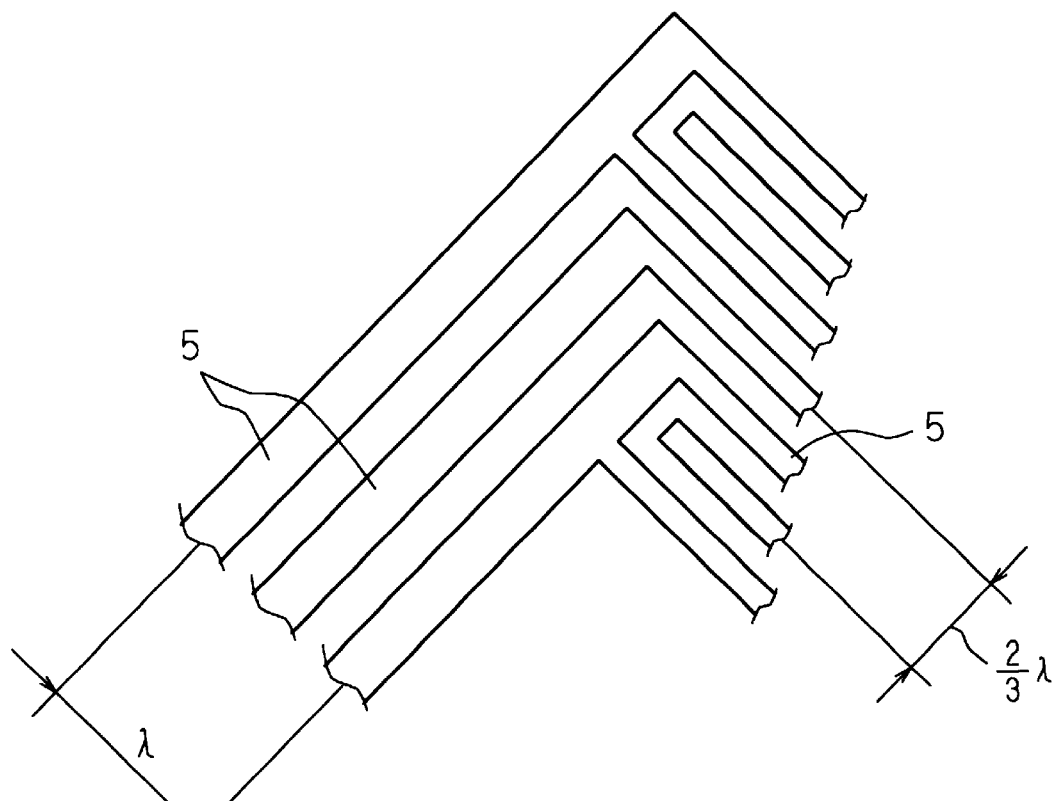
FIG. 20 is an enlarged view of a portion indicated by E in FIG. 19.

FIG. 19 is an illustration showing the basic structure of a touch panel device according to the third embodiment of the present invention. In FIG. 19, four IDTs 6 are disposed in the frame region of the detection region 1a located at the center of the rectangular non-piezoelectric substrate 1 made of a glass material. In this third embodiment, like the first and second embodiments, the IDTs 6 disposed on the upper side and lower side function as excitation elements for exciting surface acoustic waves and the IDTs 6 positioned on the left side and right side function as receiving elements for receiving the surface acoustic waves, but four different kinds of frequencies $f_1$, $f_2$, $f_3$ and $f_4$ are used. More specifically, the inner side portion of the upper-side IDT 6 and the outer side portion of the left-side IDT 6 have the same formation pitch of the comb-like electrode fingers 5 and correspond to the frequency $f_1$, and, similarly, the outer side portion of the upper-side IDT 6 and the inner side portion of the right-side IDT 6 correspond to the frequency $f_2$, the inner side portion of the lower-side IDT 6 and the outer side portion of the right-side IDT 6 correspond to the frequency $f_3$ and the outer side portion of the lower-side IDT 6 and the inner side portion of the left-side IDT 6 correspond to the frequency $f_4$. FIG. 20 is an enlarged view of a portion indicated by E in FIG. 19. The formation pitch of the comb-like electrode fingers 5 in the inner side portion of the right-side IDT 6 is λ, and the formation pitch of the comb-like electrode fingers 5 in the outer side portion of the right-side IDT 6 is 2λ/3. Therefore, when the relationship between the frequencies $f_1$ and $f_2$ is taken as an example, if the propagation velocity of the surface acoustic wave is v, then $f_2=v/\lambda$, and $f_3=v/(2\lambda/3)=3v/2\lambda=3f_2/2$.

Moreover, in this third embodiment, unlike the first and second embodiments, the respective IDTs 6 are driven unitedly. One input/output terminal 17 is provided at the right-side edge of the non-piezoelectric substrate 1, and connected to the signal electrodes 7 of the respective IDTs 6. Furthermore, one ground terminal 18 is provided at the lower right corner of the non-piezoelectric substrate 1, and connected to the ground electrodes 8 of the respective IDTs 6.

Figure 21:
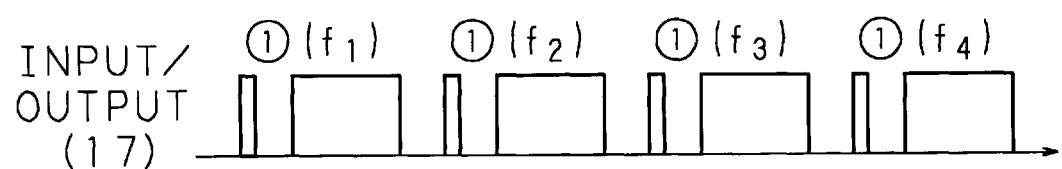
FIG. 21 is an illustration showing an example of surface acoustic wave exciting/receiving signals according to the third embodiment.

Next, the following description will explain the operation of a touch panel device having such a structure (4-frequency 1-input/output type). FIG. 21 shows an example of surface acoustic wave exciting/receiving signals. The input/output terminal 17 is driven at the frequency $f_1$ to excite the surface acoustic wave of the frequency $f_1$ from the inner side portion of the upper-side IDT 6. This surface acoustic wave of the frequency $f_1$ is received by the outer side portion of the left-side IDT 6 (①), and the receiving output is fetched from the input/output terminal 17. Next, the input/output terminal 17 is driven at the frequency $f_2$ to excite the surface acoustic wave of the frequency $f_2$ from the outer side portion of the upper-side IDT 6. This surface acoustic wave of the frequency $f_2$ is received by the inner side portion of the right-side IDT 6 (②), and the receiving output is fetched from the input/output terminal 17. Subsequently, the input/output terminal 17 is driven at the frequency $f_3$ to excite the surface acoustic wave of the frequency $f_3$ from the inner side portion of the lower-side IDT 6. This surface acoustic wave of the frequency $f_3$ is received by the outer side portion of the right-side IDT 6 (③), and the receiving output is fetched from the input/output terminal 17. Next, the input/output terminal 17 is driven at the frequency $f_4$ to excite the surface acoustic wave of the frequency $f_4$ from the outer side portion of the lower-side IDT 6. This surface acoustic wave of the frequency $f_4$ is received by the inner side portion of the left-side IDT 6 (④), and the receiving output is fetched from the input/output terminal 17. The fetched receiving outputs are input to the detection unit 20, and the position touched by the object is detected based on the receiving outputs.

In this third embodiment, since four different kinds of frequencies are used and the surface acoustic waves are propagated in only one direction in an arbitrary timing, it is possible to prevent deterioration of the S/N ratio due to overlapping of the propagating surface acoustic waves.

Further, the above-described first through third embodiments merely illustrate examples of the present invention, and it is needless to say that the present invention is also applicable to other embodiments in which the number of frequencies are used and the exciting/receiving timing in each IDT pair are appropriately set (for example, a structural example in which exciting/receiving processes in the respective IDT pairs in four directions are performed in time sequence using one kind of frequency, a structural example in which exciting/receiving processes in the respective IDT pairs are performed simultaneously using four kinds of frequencies, etc.).

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A touch panel device comprising:

a rectangular non-piezoelectric substrate;

at least one pair of excitation element and receiving element disposed at peripheral sections in a diagonal direction of said non-piezoelectric substrate, said excitation element having an IDT constructed by joining comb-like electrode fingers to facing electrode bases and exciting a surface acoustic wave, said receiving element having an IDT constructed by joining comb-like electrode fingers to facing electrode bases and receiving the surface acoustic wave; and a detection unit for detecting a position of an object touching said non-piezoelectric substrate, based on results of receiving surface acoustic waves propagated from said excitation element in a diagonal direction on said non-piezoelectric substrate at said receiving element, wherein said comb-like electrode fingers of said IDTs in said excitation element and receiving element are joined to said electrode bases so that said comb-like electrode fingers are inclined from a facing direction of said electrode bases.

2. The touch panel device of claim 1, wherein said comb-like electrode fingers have an angle of inclination in two directions from the facing direction of said electrode bases.

3. The touch panel device of claim 2, wherein said comb-like electrode fingers are bent.

4. The touch panel device of claim 2, wherein the angle of inclination of said comb-like electrode fingers is set according to an aspect ratio of a size of an object position detection region in said non-piezoelectric substrate.

5. The touch panel device of claim 1, wherein said IDTs related to surface acoustic waves propagating outside of an object position detection region are eliminated.

6. The touch panel device of claim 1, wherein a plurality of pairs of said excitation element and said receiving element are provided, and a frequency of said IDTs in each pair is different from that in other pair.

7. The touch panel device of claim 2, wherein a plurality of pairs of said excitation element and said receiving element are provided, and a frequency of said IDTs in each pair is different from that in other pair.

8. The touch panel device of claim 3, wherein a plurality of pairs of said excitation element and said receiving element are provided, and a frequency of said IDTs in each pair is different from that in other pair.

9. The touch panel device of claim 4, wherein a plurality of pairs of said excitation element and said receiving element are provided, and a frequency of said IDTs in each pair is different from that in other pair.

10. The touch panel device of claim 5, wherein a plurality of pairs of said excitation element and said receiving element are provided, and a frequency of said IDTs in each pair is different from that in other pair.

* * * * *